US011413743B2

(12) United States Patent
Yoneda

(10) Patent No.: US 11,413,743 B2
(45) Date of Patent: Aug. 16, 2022

(54) ARTICULATED STRUCTURE OF ROBOT

(71) Applicant: FANUC CORPORATION, Yamanashi (JP)

(72) Inventor: Keishi Yoneda, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 99 days.

(21) Appl. No.: 17/087,907

(22) Filed: Nov. 3, 2020

(65) Prior Publication Data
US 2021/0178573 A1 Jun. 17, 2021

(30) Foreign Application Priority Data

Dec. 13, 2019 (JP) .............................. JP2019-225656

(51) Int. Cl.
*B25J 9/10* (2006.01)
*B25J 9/00* (2006.01)

(52) U.S. Cl.
CPC ............. *B25J 9/102* (2013.01); *B25J 9/0009* (2013.01); *B25J 9/108* (2013.01)

(58) Field of Classification Search
CPC . B25J 9/0009; B25J 9/046; B25J 9/102; B25J 17/025
See application file for complete search history.

(56) References Cited

U.S. PATENT DOCUMENTS

| 5,155,423 | A | * | 10/1992 | Karlen | B25J 9/046 318/568.1 |
| 5,775,171 | A | * | 7/1998 | Richter | B25J 19/0016 901/29 |
| 5,782,133 | A | * | 7/1998 | Kullborg | B25J 9/102 74/420 |
| 6,408,224 | B1 | | 6/2002 | Okamoto et al. | |
| 2005/0016313 | A1 | * | 1/2005 | Robertson | B25J 9/046 74/490.01 |
| 2011/0265597 | A1 | * | 11/2011 | Long | B25J 9/102 901/25 |
| 2014/0137687 | A1 | | 5/2014 | Nogami et al. | |

(Continued)

FOREIGN PATENT DOCUMENTS

EP  2 732 929 A1  5/2014
JP  H02-107481 U  8/1990

(Continued)

*Primary Examiner* — Joseph Brown
(74) *Attorney, Agent, or Firm* — Maier & Maier, PLLC

(57) ABSTRACT

An articulated structure includes first and second members, and an actuator relatively rotating the first and second members about a first axis and including a motor fixed in the first member, a reducer transmitting rotation of the motor to the second member, and a mechanism transmitting power of the motor to the reducer, the reducer includes a hole extending therethrough along the first axis, and an input member supported rotatably about the first axis to receive the power. The mechanism includes a first section including an output member supported rotatably about a second axis parallel to the first axis to transmit power to the input member, a second section transmitting power between a shaft of the motor and the output member, and a housing that houses the second section to support the motor and being detachably attached to the first member at a position offset radially outward from the hole.

6 Claims, 5 Drawing Sheets

(56) References Cited

U.S. PATENT DOCUMENTS

2014/0298939 A1* 10/2014 Kim .................. B25J 9/1025
                                                        74/411.5
2017/0312924 A1* 11/2017 Kinoshita ............ B25J 15/0009
2019/0105786 A1*  4/2019 Yamashiro ............ F16H 49/001
2021/0162587 A1*  6/2021 Shinagawa .............. B25J 9/104

FOREIGN PATENT DOCUMENTS

| JP | WO-1994009949 A1 * | 5/1994 | .............. B25J 17/02 |
| JP | 2001-138279 A | 5/2001 | |
| JP | 2004-351590 A | 12/2004 | |
| JP | 2007-144559 A | 6/2007 | |
| JP | 2014-100752 A | 6/2014 | |
| KR | 0128221 Y1 * | 7/1993 | .......... B25J 17/0283 |

* cited by examiner

ARTICULATED STRUCTURE OF ROBOT

CROSS-REFERENCE TO RELATED APPLICATIONS

This application claims the benefit of Japanese Patent Application No. 2019-225656, the content of which is incorporated herein by reference.

FIELD

The present disclosure relates to an articulated structure of a robot.

BACKGROUND

There is a known articulated structure of a robot that includes two arms supported relatively rotatably about a rotation axis by a reducer, and in the structure, a motor is housed in an arm by use of a bevel gear as a gear to transmit a driving force of the motor to the reducer (e.g., see Japanese Unexamined Patent Application, Publication No. 2007-144559). In this articulated structure, an axis of the motor is disposed in a direction orthogonal to the rotation axis of each arm by use of the bevel gear.

SUMMARY

According to an aspect of the present disclosure, provided is an articulated structure of a robot, including a hollow first member, a hollow second member, and an actuator that relatively rotates the first member and the second member about a first axis, wherein the actuator includes a motor fixed in a housed state in the first member, a reducer that slows down rotation of a shaft of the motor to transmit the rotation to the second member, and a power transmission mechanism that transmits power of the motor to the reducer, the reducer includes a hollow hole extending through the reducer along the first axis, and an input member supported rotatably about the first axis to receive the power transmitted by the power transmission mechanism, the power transmission mechanism includes a first power transmitting section including an output member supported rotatably about a second axis parallel to the first axis to transmit power to the input member, a second power transmitting section that transmits power between the shaft supported rotatably about a third axis disposed in a plane crossing the second axis and the output member, and a housing that houses the second power transmitting section to support the motor, and the housing is detachably attached to the first member at a position offset radially outward from the hollow hole.

DETAILED DESCRIPTION OF EMBODIMENTS

Hereinafter, description will be made as to an articulated structure 1 of a robot according to an embodiment of the present disclosure with reference to the drawings.

Figure 1:
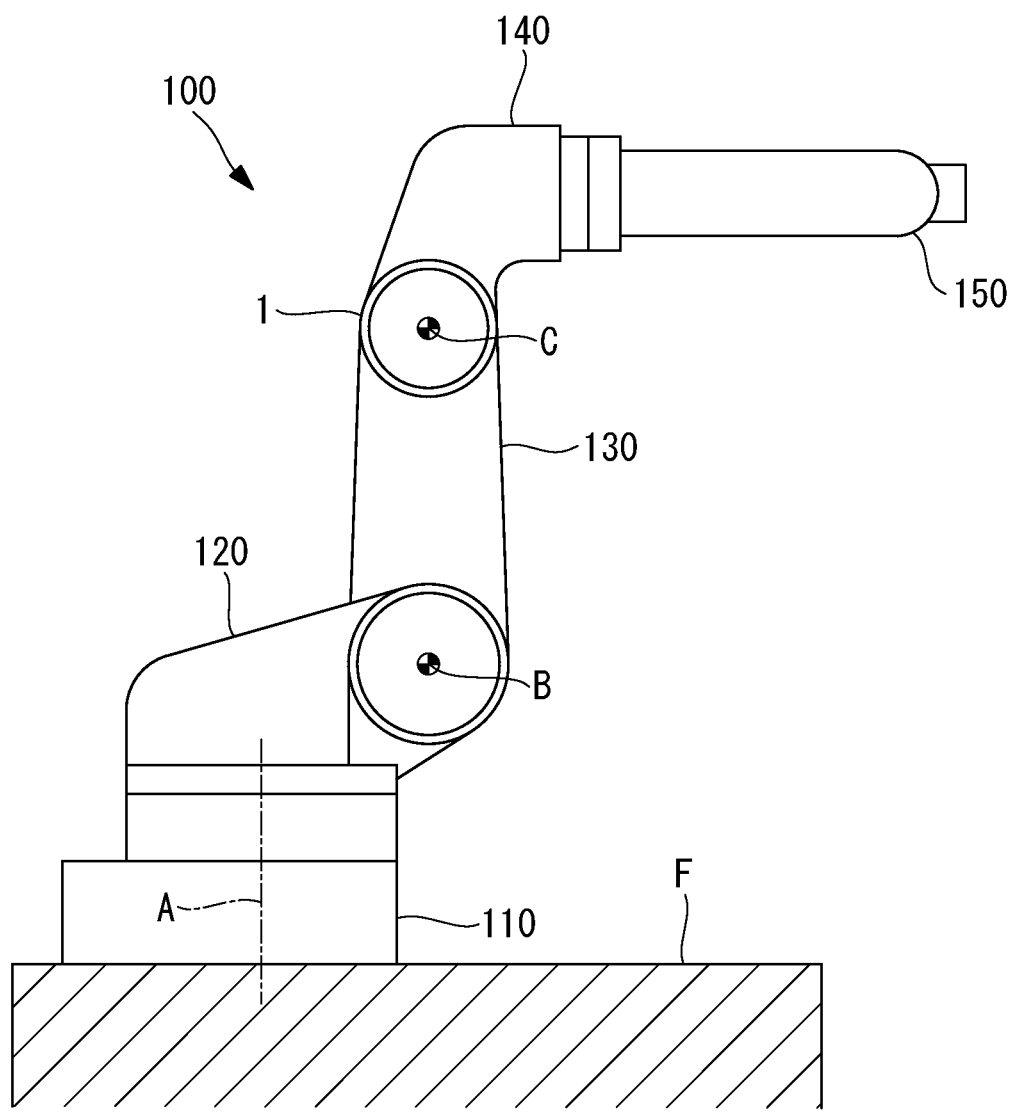
FIG. 1 is a schematic view showing an example of a robot including an articulated structure according to an embodiment of the present disclosure.

A robot 100 in which the articulated structure 1 according to the present embodiment is mounted is, for example, a vertical 6-axis articulated type robot including a base 110 installed on a floor surface F, and a swivel body 120 supported rotatably about a vertical axis A to the base 110 as shown in FIG. 1.

Furthermore, the robot 100 includes a first arm (a first member) 130 supported rotatably about a horizontal axis B to the swivel body 120, and a second arm (a second member) 140 supported rotatably about a horizontal first axis C to the first arm 130. Furthermore, the robot 100 includes a 3-axis wrist unit 150 in the second arm 140.

Figure 2:
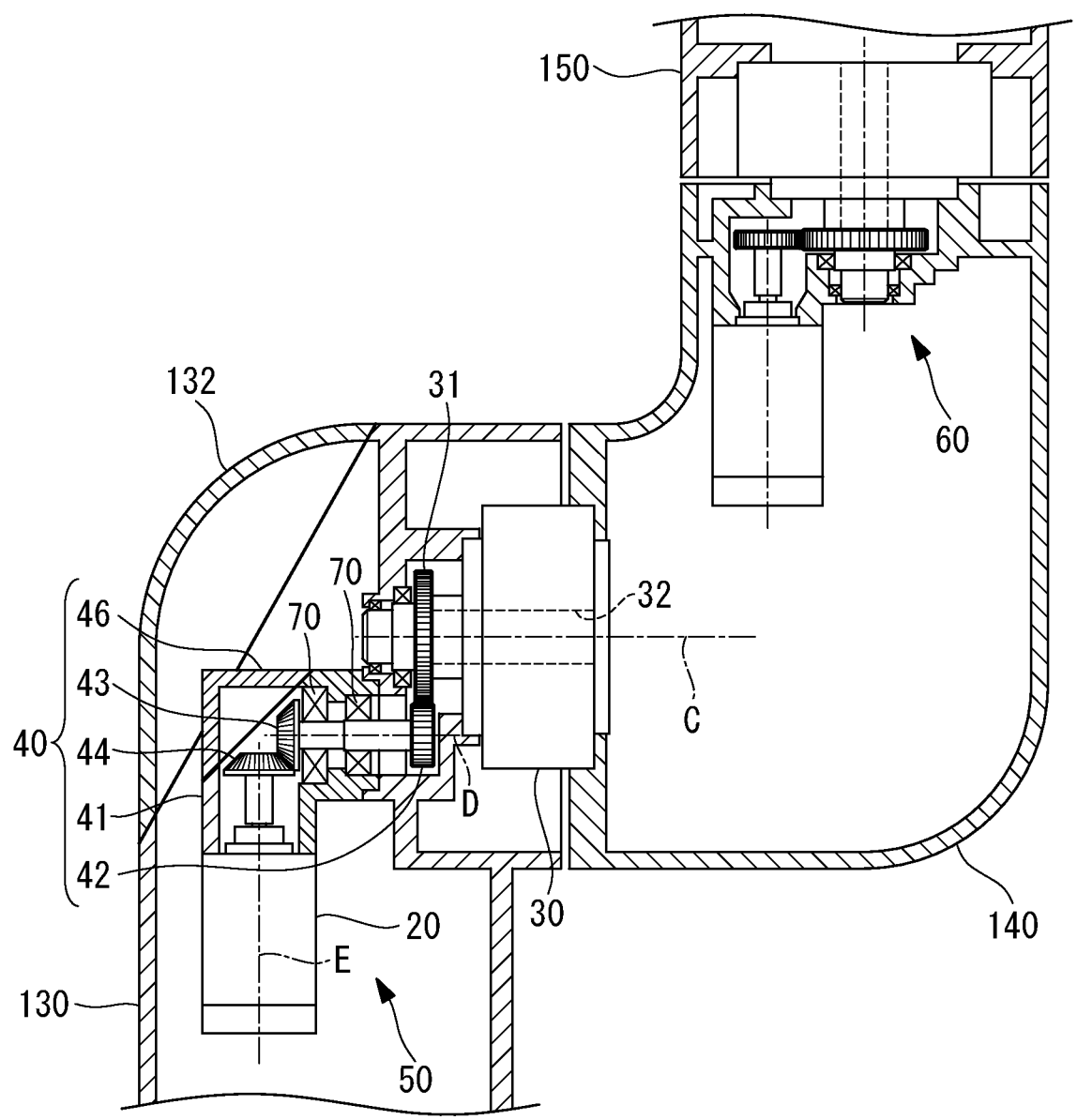
FIG. 2 is an enlarged vertical cross-sectional view showing the articulated structure of FIG. 1.

The articulated structure 1 according to the present embodiment is, for example, a structure between the first arm 130 and the second arm 140, and includes the first arm 130, the second arm 140, and an actuator that rotates and drives the second arm 140 about the first axis C to the first arm 130, as shown in FIG. 2.

Each of the first arm 130 and the second arm 140 is formed in a hollow tubular shape having a longitudinal axis.

The actuator includes a motor 20, a reducer 30, and a gear box (a power transmission mechanism) 40 that transmits power of the motor 20 to the reducer 30.

The motor 20 is detachably fixed to a housing 41 that forms the gear box 40 described later. The gear box 40 is detachably fixed to the first arm 130. Consequently, the motor 20 is indirectly fixed to the first arm 130 via the gear box 40.

The reducer 30 includes a case fixed to the first arm 130, and an output shaft supported rotatably about the first axis C to the case and fixed to the second arm 140. The reducer 30 includes a hollow hole 32 extending through a center of the reducer along the first axis C in a region including the first axis C.

In the hollow hole 32, an unshown linear object is disposed to extend through the hole.

Furthermore, the reducer 30 includes an input gear (an input member) 31 including a spur gear or a helical gear supported rotatably about the first axis C on a first arm 130 side. Rotation of a shaft of the motor 20 is input into the input gear 31, and the input gear 31 is rotated about the first axis C. Consequently, the rotation is slowed down in the reducer 30, and is output as the rotation of the output shaft, to rotate and drive the second arm 140.

The gear box 40 includes a first gear (an output member, a first power transmitting section) 42 that meshes with the input gear 31, a second gear (a second power transmitting section) 43 fixed to the first gear 42, a third gear (a second power transmitting section) 44 fixed to the shaft of the motor 20 to mesh with the second gear 43, and the housing 41.

Furthermore, the housing 41 houses the second gear 43 and the third gear 44. The first gear 42 is composed of a spur gear or a helical gear that meshes with the input gear 31. Consequently, a second axis D of the first gear 42 is disposed in parallel with the first axis C of the input gear 31.

The first gear 42 and the second gear 43 are supported rotatably about a predetermined axis by a bearing 70 in the housing 41. The bearing 70 is attached to the housing 41 in a state of being provided with a proper preload to support both a radial force and a thrust force that act on the first gear 42 and the second gear 43.

Each of the second gear 43 and the third gear 44 is composed of a bevel gear. The third gear 44 is attached to the shaft of the motor 20. The third gear 44 meshes with the second gear 43 in the housing 41, and is accordingly disposed at a position where a third axis E of the shaft of the motor 20 is orthogonal to the second axis D of the first gear 42 and the second gear 43.

Figure 3:
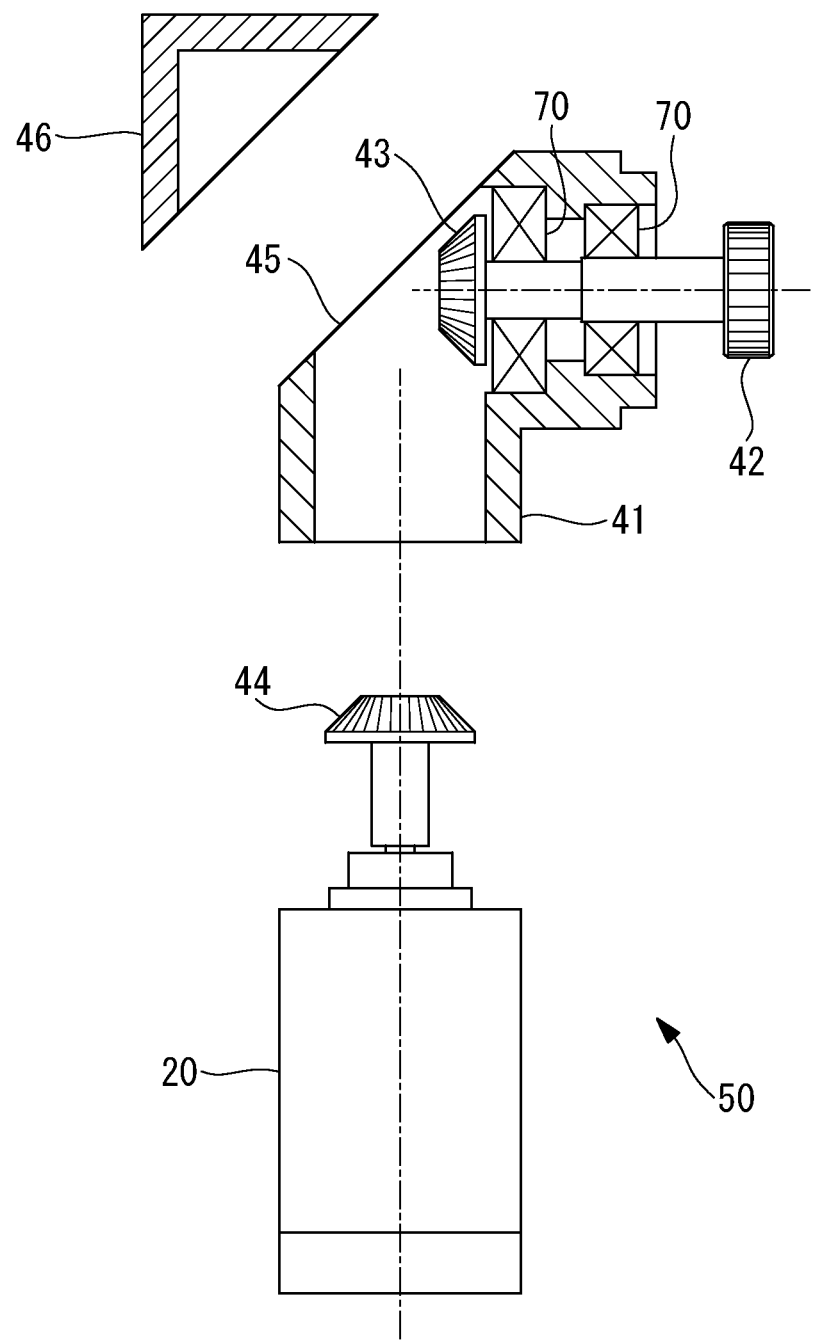
FIG. 3 is an exploded vertical cross-sectional view showing a unit provided in the articulated structure of FIG. 1.

As shown in FIG. 3, the housing 41 is provided with a first opening 45 through which a meshed position of the second gear 43 with the third gear 44 is exposed to outside. The first opening 45 is openably closed with a first lid member 46. To assemble the gear box 40, the third gear 44 attached to the shaft of the motor 20 is inserted in the housing 41 in which the first gear 42 and the second gear 43 are rotatably supported by the bearing 70, to mesh the second gear 43 with the third gear 44.

At this time, the meshing of the second gear 43 with the third gear 44 is adjusted, for example, by changing a thickness of a shim to be interposed between the motor 20 and the housing 41. In a state where the second gear 43 and the third gear 44 are properly meshed with each other and the motor 20 is attached, an appropriate amount of lubricant is supplied into the housing 41 to close the first opening 45 with the first lid member 46. Consequently, a unit 50 is formed in which the motor 20 is fixed to the gear box 40.

The first arm 130 is provided with a second opening 131 through which the unit 50 can be passed, and a second lid member 132 is provided to openably close the second opening 131. Furthermore, the unit 50 is attached at a position radially offset from the hollow hole in the first arm 130 and in parallel with the second axis D of the first gear 42 so that a longitudinal axis of the motor 20 is parallel to the longitudinal axis of the first arm 130.

Figure 4:
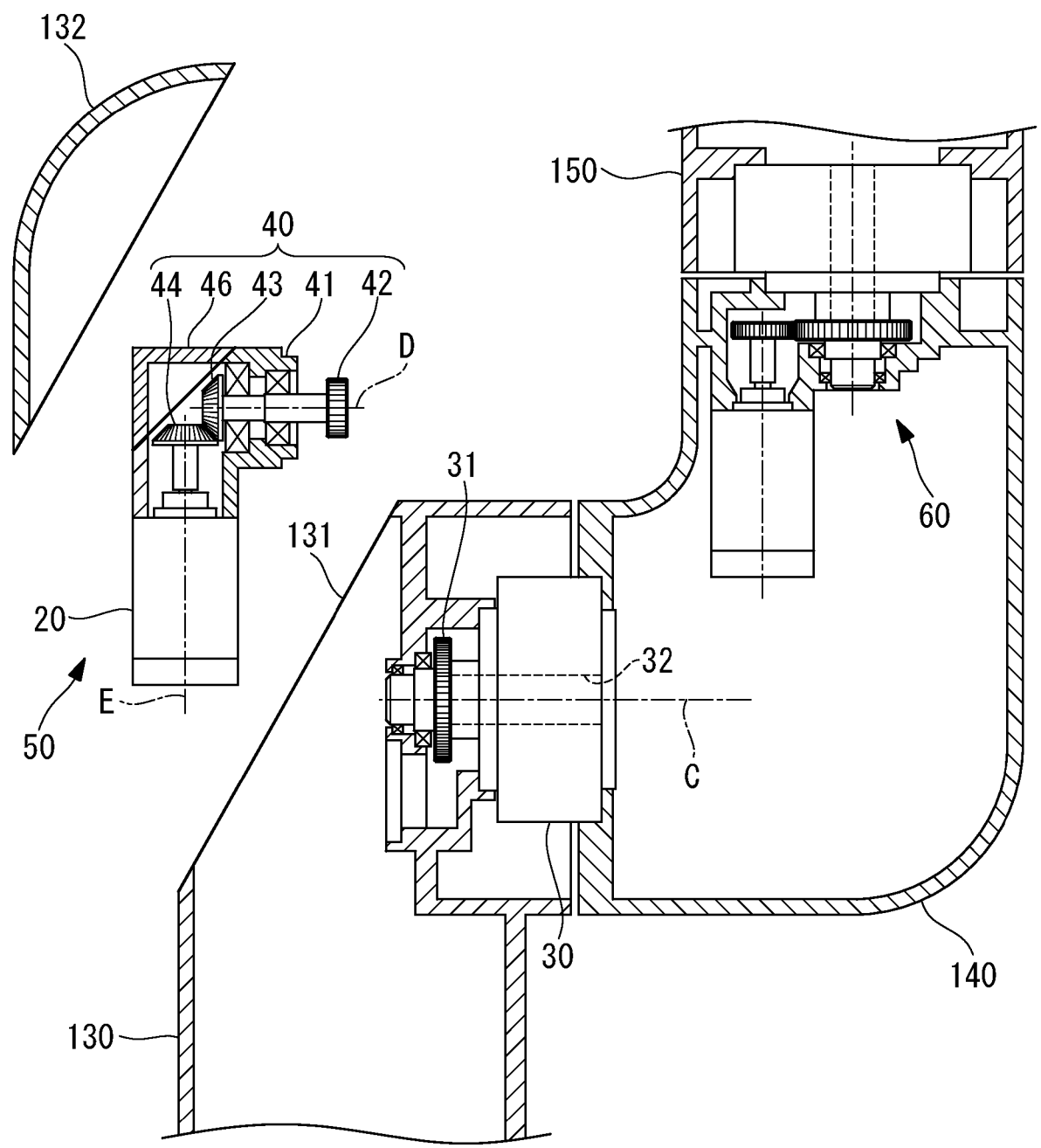
FIG. 4 is an exploded vertical cross-sectional view of the articulated structure of FIG. 1.

As shown in FIG. 4, the first arm 130 is provided with a recess part parallel to the first axis C, and the housing 41 is provided with a spigot joint part to be fitted in the recess part. The spigot joint part is fitted in the recess part, and the unit 50 is attached to the first arm 130. Consequently, the first gear 42 provided in the gear box 40 is properly meshed with the input gear 31 of the reducer 30.

In the drawing, reference number 60 indicates an actuator that rotates and drives the wrist unit 150 to the second arm 140.

Hereinafter, description will be made as to an operation of the articulated structure 1 of the robot according to the present embodiment having such a configuration.

To assemble the articulated structure 1 of the robot 100 according to the present embodiment, as shown in FIG. 3, the first lid member 46 is first removed from the housing 41 to open the first opening 45 in advance. Then, outside the first arm 130, the first gear 42 and the second gear 43 are rotatably supported by the bearing 70 in the housing 41. Then, the motor 20 including the shaft to which the third gear 44 is attached is mounted to the housing 41.

When the motor 20 is mounted to the housing 41, the third gear 44 composed of the bevel gear attached to the shaft of the motor 20 meshes with the second gear 43 composed of the bevel gear housed in the housing 41. At this time, the meshed position of the third gear 44 with the second gear 43 is exposed to the outside through the first opening 45, and hence the meshing can be properly and easily adjusted.

Consequently, the unit 50, to which the gear box 40 having the meshing adjusted and the motor 20 are attached, can be easily assembled outside the first arm 130.

Figure 5:
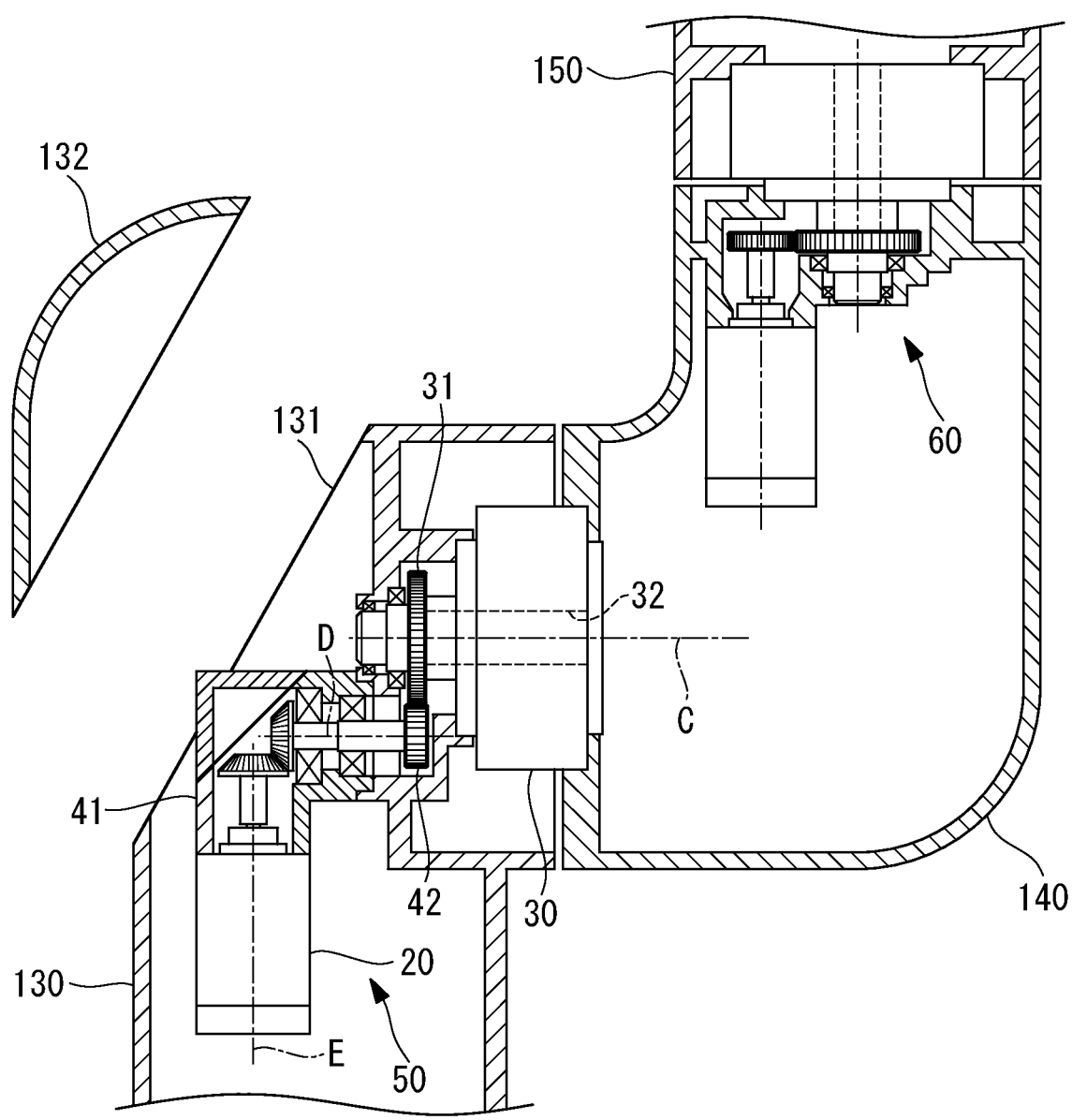
FIG. 5 is a vertical cross-sectional view showing a state where a second lid member of a first arm is removed from the articulated structure of FIG. 1.

Next, as shown in FIG. 5, the assembled unit 50 is inserted in the first arm 130 through the second opening 131 opened by removing the second lid member 132 of the first arm 130, and is attached to the first arm 130 at the position offset to the hollow hole 32 provided in the reducer 30. At this time, the spigot joint part of the housing 41 of the gear box 40 that forms the unit 50 is fitted in the recess part of the first arm 130.

Then, as the fitting of the spigot joint part in the recess part proceeds, the first gear 42 meshes with the input gear 31 of the reducer 30.

Since the first gear 42 and the input gear 31 are composed of the spur gears, respectively, the first gear 42 can be properly meshed with the input gear 31 only by moving the gear box 40 in a direction parallel to the first axis C in a state where the spigot joint part is fitted in the recess part. Afterward, the second opening 131 of the first arm 130 is closed with the second lid member 132, thereby completing assembling.

Thus, according to the articulated structure 1 of the robot according to the present embodiment, a transmission path of the power from the motor 20 to the reducer 30 is bent at right angles by the bevel gear, so that the motor 20 can extend along the longitudinal axis of the first arm 130. As a result, there are advantages that an amount of the motor 20 to be projected from the reducer 30 in a first axis C direction can be minimized and that an outer shape of the first arm 130 housing the motor 20 can be minimized.

Furthermore, the motor 20 is disposed along the first arm 130, and hence a ratio of a cross section of an interior of the first arm 130 to be occupied by the motor 20 can be decreased. Consequently, there is an advantage that a sufficient space to arrange the linear object and another component can be achieved.

Furthermore, the third gear 44 composed of the bevel gear attached to the motor 20 meshes with the second gear 43 composed of the bevel gear attached to the housing 41, not in the narrow interior of first arm 130 but outside the first arm 130, which facilitates an assembling operation.

Additionally, in the first arm 130, the spigot joint part of the housing 41 is only fitted in the recess part of the first arm 130, so that the first gear 42 and the input gear 31 can properly mesh with each other. Therefore, the meshing of the first gear 42 with the input gear 31 does not have to be adjusted, which can facilitate the assembling operation.

In addition, according to the present embodiment, the second gear 43 and the third gear 44 composed of the bevel gears are provided with a load in a thrust direction by rotation, but the load in the thrust direction that is generated in the second gear 43 is supported by the bearing 70. Furthermore, the load in the thrust direction that is generated in the third gear 44 may only be supported by a bearing provide in the motor 20.

Alternatively, the third gear 44 may be also supported by a bearing in the housing 41, to support a radial loads and a thrust load. In this case, the third gear 44 may be coupled to the shaft of the motor 20, for example, by spline combination or key combination.

Furthermore, in the present embodiment, the articulated structure 1 between the first arm 130 and the second arm 140 has been illustrated. Alternatively, the present disclosure may be applied to an articulated structure between the swivel body 120 and the first arm 130 or an articulated structure in the wrist unit 150.

Additionally, there has been illustrated a case where the articulated structure includes the spur gear or the helical gear as the input member, and includes the output member composed of the spur gear or the helical gear as the first power transmitting section. Alternatively, the output member and the input member may be composed of pulleys, respectively, and these pulleys and a belt laid across the pulleys may be employed as the first power transmitting section.

Furthermore, the second gear 43 and the third gear 44 are composed of the bevel gears, respectively. Alternatively, a gear capable of transmitting power between crossing axes, such as a hypoid gear, may be employed.

The invention claimed is:

1. An articulated structure of a robot, comprising a hollow first member, a hollow second member, and an actuator that relatively rotates the first member and the second member about a first axis, wherein
    the actuator comprises a motor fixed in a housed state in the first member, a reducer that slows down rotation of a shaft of the motor to transmit the rotation to the second member, and a power transmission mechanism that transmits power of the motor to the reducer,
    the reducer comprises a hollow hole extending through the reducer along the first axis, and an input member supported rotatably about the first axis to receive the power transmitted by the power transmission mechanism,
    the power transmission mechanism comprises a first power transmitting section including an output member supported rotatably about a second axis parallel to the first axis to transmit power to the input member, a second power transmitting section that transmits power between the shaft supported rotatably about a third axis disposed in a plane crossing the second axis and the output member, and a housing that houses the second power transmitting section to support the motor, and
    the housing is detachably attached to the first member at a position offset radially outward from the hollow hole.

2. The articulated structure of the robot according to claim 1, wherein the input member is composed of a spur gear or a helical gear,
    the first power transmitting section is a first gear that meshes with the input member, and
    the second power transmitting section comprises a second gear composed of a bevel gear fixed to the first gear, and a third gear composed of a bevel gear that meshes with the second gear and connects with the motor.

3. The articulated structure of the robot according to claim 2, wherein the housing comprises a first opening through which a meshed position of the second gear with the third gear is exposed, and a first lid member that openably closes the first opening.

4. The articulated structure of the robot according to claim 2, wherein the housing comprises a bearing that rotatably supports the first gear and the second gear and that supports a radial force and a thrust force.

5. The articulated structure of the robot according to claim 3, wherein the housing comprises a bearing that rotatably supports the first gear and the second gear and that supports a radial force and a thrust force.

6. The articulated structure of the robot according to claim 1, wherein the first member comprises a second opening that allows the housing equipped with the motor to pass through the second opening, and a second lid member that openably closes the second opening.

\* \* \* \* \*